US009265366B2

(12) United States Patent
Zhou et al.

(10) Patent No.: US 9,265,366 B2
(45) Date of Patent: Feb. 23, 2016

(54) COMPOSITE BOARDS AND ART FRAMES INCLUDING THE SAME

(75) Inventors: Xiaoqi Zhou, San Diego, CA (US); David Edmondson, San Diego, CA (US); Francois K. Pirayesh, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 42 days.

(21) Appl. No.: 14/370,079

(22) PCT Filed: Feb. 10, 2012

(86) PCT No.: PCT/US2012/024696
§ 371 (c)(1),
(2), (4) Date: Jul. 1, 2014

(87) PCT Pub. No.: WO2013/119254
PCT Pub. Date: Aug. 15, 2013

(65) Prior Publication Data
US 2014/0338242 A1 Nov. 20, 2014

(51) Int. Cl.
*A47G 1/06* (2006.01)
*B32B 29/00* (2006.01)
(Continued)

(52) U.S. Cl.
CPC ............. *A47G 1/0633* (2013.01); *B32B 3/28* (2013.01); *B32B 7/12* (2013.01); *B32B 7/14* (2013.01); *B32B 29/00* (2013.01); *B32B 29/005* (2013.01); *B32B 29/08* (2013.01); *D21H 13/12* (2013.01); *D21H 13/20* (2013.01); *D21H 13/36* (2013.01); *D21H 17/34* (2013.01); *D21H 17/60* (2013.01); *D21H 21/16* (2013.01); *D21H 27/30* (2013.01); *B32B 2250/26* (2013.01); *B32B 2260/028* (2013.01); *B32B 2260/046* (2013.01); *B32B 2262/0246* (2013.01); *B32B 2262/0253* (2013.01); *B32B 2262/0261* (2013.01); *B32B 2262/0276* (2013.01); *B32B 2262/0292* (2013.01); *B32B 2262/065* (2013.01); *B32B 2262/067* (2013.01); *B32B 2262/106* (2013.01);
(Continued)

(58) Field of Classification Search
USPC .......................................................... 40/773
See application file for complete search history.

(56) References Cited

U.S. PATENT DOCUMENTS

| 2,085,097 A | 6/1937 | Hansen |
| 2,146,318 A | 2/1939 | Viscount |

(Continued)

FOREIGN PATENT DOCUMENTS

| DE | 3701293 | 4/1988 |
| EP | 793990 | 9/1997 |

(Continued)

OTHER PUBLICATIONS

Yang, H,. "Fundamentals, Preparation, and Characterization of Superhydrophobic Wood Fiber Products", Thesis, 2008, Georgia Institute of Technology, 95 pages.

*Primary Examiner* — Joanne Silbermann
(74) *Attorney, Agent, or Firm* — HP Inc. Patent Department

(57) ABSTRACT

Composite boards are disclosed herein. An example of the composite board includes a first outer layer, a second outer layer, and a middle layer positioned between the first and second outer layers. The first and second outer layers each include chemical pulped cellulose fibers and low moisture absorbing fibers. The middle layer includes the cellulose fibers and a moisture repelling agent. Also disclosed herein are art frames that include the composite boards.

15 Claims, 5 Drawing Sheets

(51) Int. Cl.

| | | |
|---|---|---|
| *D21H 27/30* | (2006.01) | |
| *D21H 13/12* | (2006.01) | |
| *D21H 13/20* | (2006.01) | |
| *D21H 13/36* | (2006.01) | |
| *D21H 17/34* | (2006.01) | |
| *D21H 17/60* | (2006.01) | |
| *D21H 21/16* | (2006.01) | |
| *B32B 7/12* | (2006.01) | |
| *B32B 7/14* | (2006.01) | |
| *B32B 29/08* | (2006.01) | |
| *B32B 3/28* | (2006.01) | |

(52) U.S. Cl.
CPC ......... *B32B 2307/73* (2013.01); *B32B 2451/00* (2013.01); *Y10T 428/24694* (2015.01); *Y10T 428/3179* (2015.04); *Y10T 428/31507* (2015.04); *Y10T 428/31591* (2015.04); *Y10T 428/31663* (2015.04); *Y10T 428/31808* (2015.04); *Y10T 428/31841* (2015.04); *Y10T 428/31848* (2015.04); *Y10T 428/31902* (2015.04); *Y10T 428/31982* (2015.04)

(56) References Cited

U.S. PATENT DOCUMENTS

| | | | |
|---|---|---|---|
| RE22,683 E | * | 10/1945 | Piper .................. G09F 1/06 40/746 |
| 2,851,208 A | | 9/1958 | Samsing |
| 3,053,001 A | | 9/1962 | Allen |
| 3,214,855 A | | 11/1965 | Winkler et al. |
| 3,240,130 A | | 3/1966 | Neff |
| 3,733,809 A | | 5/1973 | Reiter et al. |
| 4,112,604 A | | 9/1978 | Ott et al. |
| 4,279,087 A | | 7/1981 | Crawford |
| 4,738,041 A | | 4/1988 | Drueck, Jr. |
| 4,870,766 A | | 10/1989 | Topping |
| 5,032,436 A | | 7/1991 | Gustafson |
| 5,255,458 A | | 10/1993 | Piel |
| 5,359,794 A | | 11/1994 | Wood |
| 5,513,455 A | | 5/1996 | Walker |
| 5,678,339 A | | 10/1997 | Marventano |
| 5,679,145 A | | 10/1997 | Andersen et al. |
| 5,681,621 A | | 10/1997 | Allin |
| 5,683,772 A | | 11/1997 | Andersen et al. |
| 5,947,437 A | | 9/1999 | Tate et al. |
| 5,950,341 A | | 9/1999 | Cross |
| 5,974,714 A | | 11/1999 | Jones |
| 6,177,516 B1 | | 1/2001 | Hudak |
| 6,265,037 B1 | | 7/2001 | Godavarti et al. |
| 6,427,371 B2 | | 8/2002 | Olson et al. |
| 6,475,713 B1 | | 11/2002 | Aylward et al. |
| 6,541,852 B2 | | 4/2003 | Beroz et al. |
| 6,649,245 B2 | | 11/2003 | Lenderink |
| 6,762,339 B1 | * | 7/2004 | Klun .................. A61F 13/531 602/41 |
| 6,883,908 B2 | | 4/2005 | Young et al. |
| 7,485,359 B2 | * | 2/2009 | Tamagawa ............ B41M 5/40 428/141 |
| 7,818,904 B2 | | 10/2010 | Wagner |
| 7,851,391 B2 | | 12/2010 | Bond et al. |
| 7,918,047 B1 | | 4/2011 | Ngan |
| 2002/0144445 A1 | | 10/2002 | Gomez del Campo Diaz Barrerio |
| 2003/0039853 A1 | | 2/2003 | Faucher |
| 2003/0129361 A1 | | 7/2003 | Plug et al. |
| 2004/0159031 A1 | | 8/2004 | Chang |
| 2004/0192144 A1 | | 9/2004 | Chuang |
| 2006/0051528 A1 | * | 3/2006 | Ogino .................. B41M 5/5236 428/32.21 |
| 2006/0189236 A1 | | 8/2006 | Davis et al. |
| 2009/0229157 A1 | | 9/2009 | Mehler |
| 2010/0196603 A1 | | 8/2010 | Ohshima et al. |
| 2011/0016759 A1 | | 1/2011 | Ramos-Gonzalez et al. |
| 2011/0088294 A1 | | 4/2011 | Docking |
| 2011/0117176 A1 | | 5/2011 | Klun et al. |

FOREIGN PATENT DOCUMENTS

| | | |
|---|---|---|
| EP | 1262311 | 12/2002 |
| GB | 589621 | 6/1947 |
| GB | 726212 | 3/1955 |
| GB | 1040995 | 9/1966 |
| GB | 1439323 | 6/1976 |
| GB | 2104378 | 3/1983 |
| GB | 2220854 | 1/1990 |
| GB | 2296866 | 7/1996 |
| GB | 2376916 | 12/2002 |
| GB | 2461863 | 1/2010 |
| WO | WO 2011/010085 | 1/2011 |

* cited by examiner

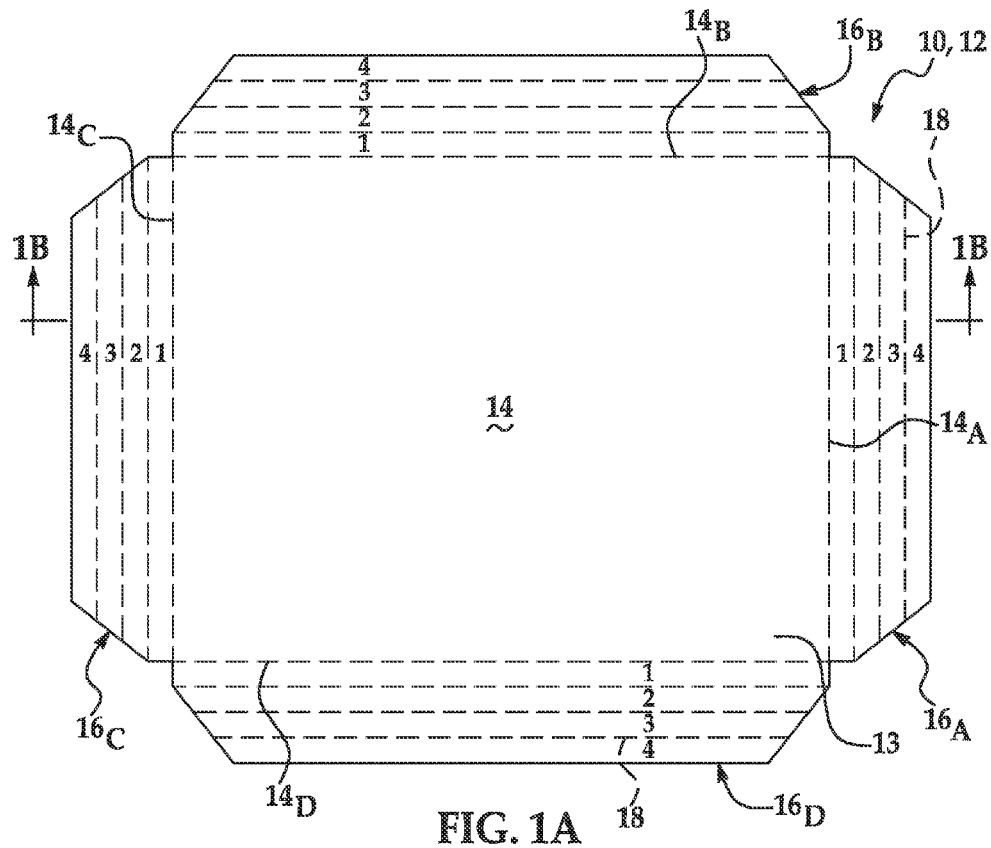
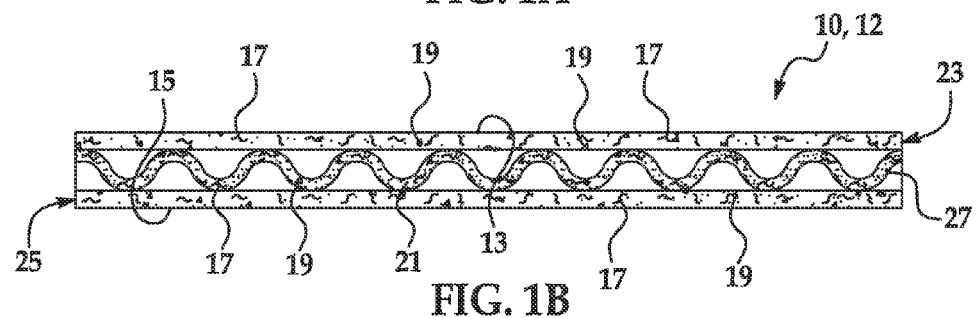
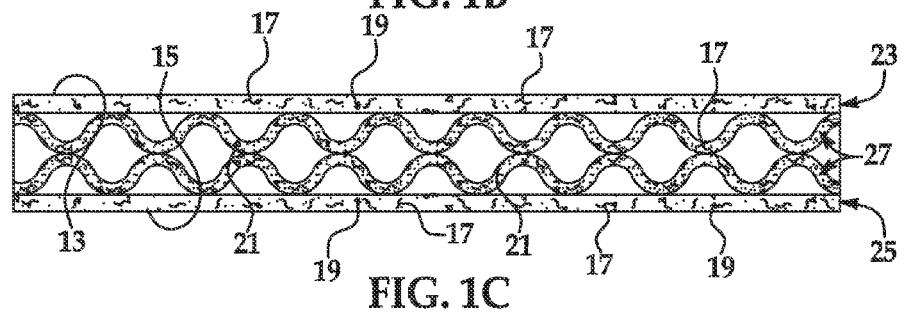
FIG. 1A
FIG. 1B
FIG. 1C

COMPOSITE BOARDS AND ART FRAMES INCLUDING THE SAME

BACKGROUND

The present disclosure relates generally to composite boards and art frames including the same.

The global print market is in the process of transforming from analog printing to digital printing. Inkjet printing and electrophotographic printing are examples of digital printing techniques. These printing techniques have become increasingly popular for printing photographs and/or decorative art items. As examples, an image may be inkjet printed on canvas and then mounted on a wood frame, or an image may be liquid electro-photographically printed on a high gloss medium and then mounted on a metal plate.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1A is a front view of an example of a foldable material formed of an example of a composite board;

FIG. 1B is a semi-schematic, cross-sectional view taken along line 1B-1B in FIG. 1A;

FIG. 1C is a semi-schematic, cross-sectional view of another example of the foldable material;

DETAILED DESCRIPTION

Figure 2A:
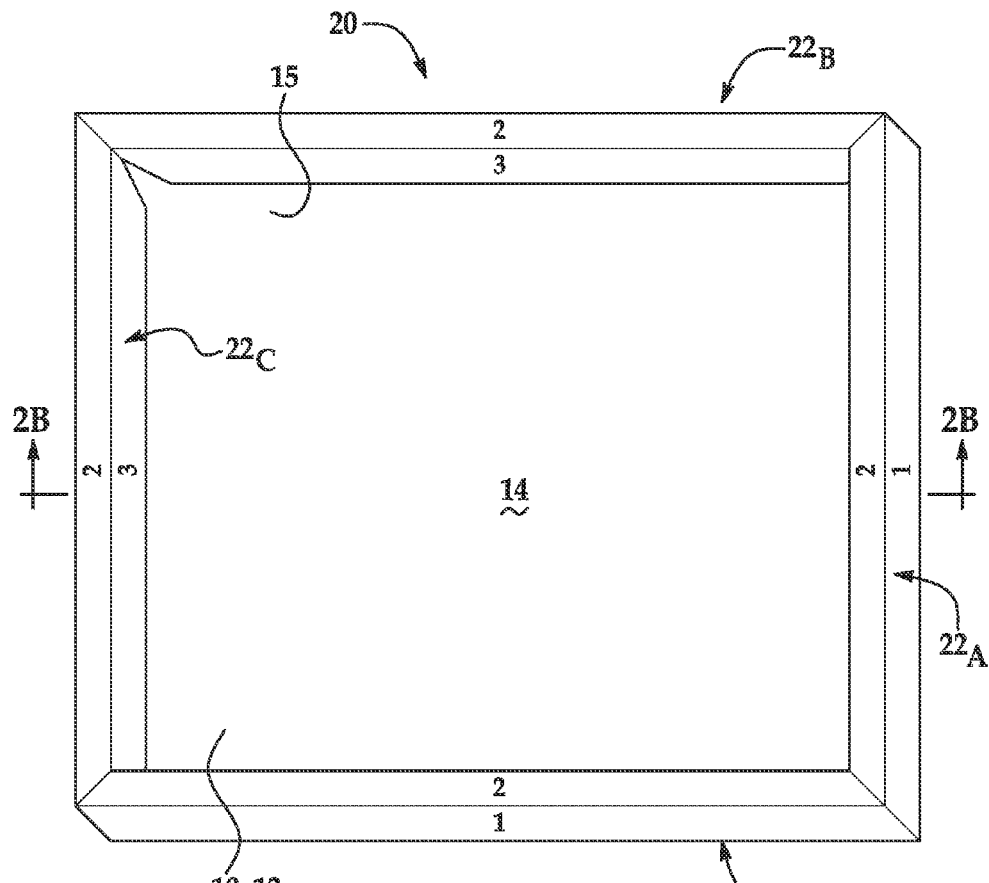
FIG. 2A is a back, perspective view of an example of the foldable material of FIG. 1A after it has been folded to form an example of the art frame.

Examples of the composite board disclosed herein are foldable to form an art frame for displaying photographs, art images, graphics, text, and/or the like, and/or combinations thereof. Various layers of the composite boards disclosed herein include cellulose fibers and/or low moisture absorbing fibers, and a middle layer also includes a moisture repelling agent. These components assist in reducing moisture uptake of the composite board. Reduction of moisture absorption reduces undesirable cracking, wrinkling, or other deleterious effects that may occur as a result of moisture uptake in the composite board.

Examples of the composite board include at least three layers (i.e., a middle layer and respective outer layers positioned on opposed surfaces of the middle layer). In some instances, the middle layer may be made up of multiple sub-layers, and each of the other layers may be made up of multiple sub-layers. In an example, each of the layers includes cellulose fibers and the low moisture absorbing fibers. The middle layer also includes the moisture repelling agent in addition to the cellulose and low moisture absorbing fibers. In another example, each of the outer layers includes cellulose fibers and the low moisture absorbing fibers, and the middle layer include the cellulose fibers and the moisture repelling agent (e.g., without the low moisture absorbing fibers). In some instances, the respective layers of the composite board do not include any other components. In other instances, additives, such as a polymeric binder, a coupling agent, and/or an inorganic filler may be included in one or more of the respective layers of the composite board.

The middle of the three layers may or may not be corrugated. In an example, the middle layer may be a single corrugated layer (see FIG. 1B); and in another example, the middle layer may be constructed using two corrugated layers resulting in two oppositely facing lattices (see FIG. 1C). While corrugated middle layers are shown in the drawings, it is to be understood that the middle layer may be made up of one or more non-corrugated layers, or combinations of corrugated and non-corrugated layers.

Low molecular weight polyethylene or a paraffin wax dispersion has been used as a water repelling agent on the surface of a cellulose based medium to reduce moisture uptake. These waxes are not chemically compatible with cellulose fibers, and they often form numerous micro-domains on the surface of the media. It has been found that these domains interact with ink components, and the resultant print-out shows some non-uniformity. The creation of domains is avoided in the examples disclosed herein, at least in part because the moisture repelling agent is incorporated into the inner layer of the composite board.

The composite board may be formed using standard paper mill processes. The various layers will be described throughout the description below. It is to be understood that the various layers may be sandwiched together using a polymeric adhesive or chemically modified starch. The composite board disclosed herein may be carton board (e.g., solid bleached board, solid unbleached board), white lined chipboard, liquid packaging board, folding boxboard, container board (e.g., liner board), wall paper substrates, uncoated cover paper, or the like, as long as the three layers disclosed herein are included in the composite board.

In the description of FIGS. 1A and 1B, the middle layer is described as being corrugated and including the cellulose fibers, the low moisture absorbing fibers, and the moisture repelling agent. However, as noted above, it is to be understood that in other examples, the low moisture absorbing fibers may be omitted from the middle layer. This example is described in reference to FIG. 1C. Still further, the middle layer of the composite boards may also be non-corrugated.

The cellulose fibers present in each of the layers (i.e., the outer layers and the middle layer) of the composite board are made up of fibers from a hardwood species, fibers from a softwood species, or a combination of fibers from both hardwood and softwood species. Examples of hardwood species include broadleaf deciduous trees, and an example of a softwood species includes needle-bearing, conifer trees and evergreens. The hardwood cellulose fibers have an average fiber length ranging from about 0.5 mm to about 3 mm, and the softwood cellulose fibers have an average fiber length ranging from about 3 mm to about 7 mm. A ratio of hardwood fibers to softwood fibers in any individual layer of the composite board may range from 100:0 to 0:100. In some examples, the ratio of hardwood fibers to softwood fibers in the outer layers ranges from 70:30 to 50:50, and in the middle layer ranges from 30:70 to 10:90.

The cellulose fibers present in the outer layers are made from a chemical pulping process (e.g., the Kraft process). The chemical pulping process forms chemical pulp. The wood lignin in chemical pulp is broken and separated by heat and chemicals used in the chemical pulping process.

The cellulose fibers present in the middle layer may be mechanical pulp or a mixture of mechanical pulp with chemical pulp or recycled pulps. Chemical pulp is formed as previously described. Mechanical pulp may be formed by steaming and grinding wood to separate the fibers and obtain groundwood pulp that contains lignin. Mechanical pulp may include pulps formed using hybrid processes, such as thermomechanical pulp (TMP) and chemithermomechanical pulps (CTMP).

As noted above, in some examples, each of the layers (i.e., the outer layers and the middle layer) of the composite board also includes the low moisture absorbing fiber. The low moisture absorbing fibers may be added to the cellulose fibers during the pulping process. "Low moisture absorbing", as the term is used herein, refers to any fiber that has a water intake of less than 0.8% by weight when exposed to about 30° C. and about 80% humidity for about 24 hours.

Examples of the low moisture absorbing fiber include some inorganic fibers and some organic fibers. A specific example of the low moisture absorption inorganic fibers includes carbon fibers. When inorganic fibers are used as the low moisture absorbing fibers, they may be present in an amount ranging from about 5 wt % to about 20 wt % of the total amount of fibers used. This range may be suitable for the first outer layer(s), the middle layer(s), and/or the second outer layer(s).

Other examples of the low moisture absorption organic fibers are synthetic fibers made by the polymerization of one or more organic monomers. It is believed that synthetic fibers may improve a number of characteristics of the composite board, including the water resistance and dimensional stability (i.e., the ability of the composite board to retain its unfolded and or folded shape when subjected to varying degrees of temperature, moisture, and pressure (e.g., indoor use environment where temperature ranges from about 15° C. to about 40° C., moisture ranges from about 10% humidity to about 80% humidity, and pressure ranges from about 0.8 atm to about 1 atm), or other stress, such as stress generated from adhesion bond and from interface mis-match due to different coefficients of thermal expansion). Synthetic organic fibers may be made from polyolefins or polyolefin copolymers, polyamides, polyesters, polyurethanes, polycarbonates, or polyacrylics. More specific examples of the synthetic organic fibers made from polyolefins or polyolefin copolymers include polyethylene fibers, polypropylene fibers, polyethylene copolymer fibers, or polypropylene copolymer fibers. In some examples, polyethylene or polypropylene copolymers refer to the copolymers of ethylene and/or propylene with linear alkenes such as 1-butene, 1-hexene, 1-octene, 1-decene, 1-dodecene, 1-tetradecene, 1-hexadecene, and 1-octadecene. In other examples, polyethylene or polypropylene copolymers refer to the copolymers of ethylene and/or propylene with branched alkenes, such as isobutene. In yet another example, the ethylene copolymer is ethylene with vinyl acetate and its partial or complete hydrolysis products, such as polyvinyl alcohol fibers.

In order to achieve a desirable length for the synthetic organic fibers, the fibers may be exposed to a refining process in a paper mill. The desirable length for the synthetic fibers may be comparable to the length of the cellulose fibers, namely ranging from about 0.5 mm to about 3 mm. In some instances, the average length of the synthetic fibers ranges from about 1 mm to about 3 mm, and in other instances, the average length of the synthetic fibers ranges from about 2 mm to about 7 mm. As an example, the synthetic organic fibers have an average diameter ranging from about 10 µm to about 40 µm and an average length ranging from about 2 mm to about 7 mm. It is believed that longer synthetic fibers may be used in the examples disclosed herein, as long as the synthetic fibers do not negatively impact the formation of the composite board, for example, on the screen of the paper mill.

When the synthetic organic fiber is selected as the low moisture absorbing fiber, the amount of the synthetic organic fiber used in the various layers of the composite board depends, at least in part, on the length of the fiber. For example, when longer synthetic organic fibers are used, it is believed that lower amounts may be included while still achieving a desirable dimensional stability. In an example of the first and second outer layers, from about 5 parts to about 65 parts by weight of synthetic organic fiber is included for every 100 parts of cellulose fiber. In another example, the first and second outer layers include from about 15 parts to about 50 parts by weight of synthetic organic fiber for every 100 parts of cellulose fiber. In an example of the middle layer, from about 15 parts to about 30 parts by weight of synthetic organic fiber is included for every 100 parts of cellulose fiber.

Properties (e.g., melting point) of the synthetic organic fibers may affect the characteristics of the resulting composite board. If the melting point of the synthetic organic fibers is too low (e.g., being less than 80° C.), the synthetic organic fibers may have low stiffness and the composite board may not have the desired rigidity. If, however, the synthetic organic fibers have a melting point that is too high (e.g., being greater than 160° C.), there may be difficulties in processing the fibers and the composite board. In an example, the synthetic organic fibers may have a crystalline structure with a melting point ranging from about 100° C. to about 140° C.

The middle layer (with or without the low moisture absorbing fibers, and with or without being corrugated) also undergoes a moisture-proofing process by implementing the moisture repelling agent therein before the middle layer is sandwiched together with the respective outer layers to form the composite board. The addition of the moisture repelling agent further reduces the uptake of moisture by the cellulose fibers and further improves anti-moisture absorbing performance. The moisture repelling agent may be added as the wet end chemicals before the pulp enters the headbox section of the paper machine, if the moisture repelling agent is compatible with the wet end chemistry. The moisture repelling agent may also be added as an additive in the surface treatment formulation and/or the surface coating formulation. The moisture repelling agent may be used in an amount that is up to 5% of the total fiber weight (i.e., total weight of the cellulose fibers and the low moisture absorbing fibers). There is a variety of moisture repelling agents that may be used in the middle layer. Examples of suitable moisture repelling agents include silane-based repellents, such as isooctyltriethoxysilane and octyltriethoxysilane; a polyethylene wax based repellent; a paraffin wax based repellent; or repellents based on the reaction product of a hydrocarbon wax with any of rosin resin, fluoro-polymers, fluoro-silicone copolymers, vinylidene chloride latex, or hydrophobic polymers and copolymers, such as styrene copolymer latex, acrylic latex, polyethylene emulsions and ethylene-vinyl acetate copolymer.

As noted above, any of the layers of the composite board may include one or more additives. Suitable additives include polymeric binders, coupling agents, inorganic fillers, or combinations thereof. In some instances, the additive(s) is/are selected to make the low moisture absorbing fiber more compatible with the cellulose fiber.

Polymeric binders act as bridges that link wood fibers and low moisture absorbing fibers by one or more of the following mechanisms: covalent bonding, polymer chain entanglement, and strong secondary interactions. The linking of the fibers helps to avoid the segregation of the low moisture absorbing fibers (e.g., synthetic fibers), which tends to result in poor formation. A polymeric binder or a mixture of polymeric binders may be pre-mixed with the cellulose fiber during pulping processing before loading to the headbox section of the paper machine. When included, the amount of polymeric binder that may be added ranges from about 0.1% to about 15% by weight of the total fibers (i.e., cellulose fiber plus low moisture absorbing fiber). In an example, any of the outer layer(s) or the middle layer(s) of the composite board includes from about 2% to about 6% by weight of the polymeric binder or a mixture of the polymeric binders. Suitable polymeric binders include, for example, water soluble polymers, such as polyvinyl alcohol, starch derivatives (e.g., oxidized starch, cationized starch, esterified starch, enzymatically denatured starch, etc.), and/or water-dispersible polymers, such as acrylic polymers or copolymers, vinyl acetate latex, polyesters, vinylidene chloride latex, styrene-butadiene copolymer latex, and/or acrylonitrile-butadiene copolymer latex.

Another suitable additive may be a coupling agent. The coupling agent may be used to improve binding between the cellulose fiber and the low moisture absorbing fiber. Some of the synthetic organic fibers, such as polyolefin fibers or polyolefin copolymer fibers, may have a nonpolar and high crystalline surface structure which may result in segregation of the synthetic organic fibers from the cellulose fibers. This segregation may result in a composite board with poor foldability and poor mechanical strength. In an example, to overcome the challenges that may potentially result from segregation, a coupling agent or a combination of coupling agents may be used. Without being bound to any theory, it is believed that coupling agents may be functionalized as both bonding agents and surfactants (surface-active agents), including compatibilizers and dispersing agents simultaneously. The coupling agent used in the examples disclosed herein may be organic, inorganic, or organic-inorganic hybrid groups. Organic coupling agents include isocyanates, anhydrides, amides, imides, acrylates, chlorotriazines, epoxides, or monomers, polymers, or copolymers of organic acids. Inorganic coupling agents include silicates, and organic-inorganic coupling agents include silanes, such as γ-aminopropyltriethoxy silane, γ-methacryloxypropyltrimethoxy silane, and vinyltri(2-methoxyethoxy) silane, and titanates, such as titanium di(dioctylpyrophosphate)oxyacetate. The coupling agent can be applied to the low moisture absorbing fibers and the cellulose fibers via compounding, blending, soaking, or spraying methods. The amount of coupling agent used in any given layer ranges from about 0.5% to about 2% by weight of the total fiber weight of that layer.

In some examples, the synthetic organic fibers may be pre-treated in a corona chamber at room temperature (i.e., from about 18° C. to about 22° C.) and atmospheric condition (i.e., humidity ranging from about 30% to about 60% under air) for 30 seconds or less. During the corona treatment, polar groups, such as hydroxyl groups, ketone groups and carboxyl groups, are grafted onto the synthetic fibers, and the reactive free radical particles generated from air also attach to the fiber surface. These groups and particles are believed to improve polarity of the fiber surface, which subsequently increases the fiber surface energy in conjunction with the coupling agent. Increased fiber surface energy can significantly reduce the synthetic fiber's tendency to segregate. In another example, to overcome the challenges that may potentially result from segregation, the synthetic organic fibers may be pre-washed with a sulfuric acid ($H_2SO_4$) solution of from about 30% to about 50% concentration by weight to oxidize and etch the synthetic fiber surface to improve its hydrophilicity. The sulfuric acid treatment improves the hydrophilicity of the low moisture absorbing fiber. The improvement in hydrophilicity decreases the tendency of the synthetic fiber to segregate from the cellulose fiber, but will not render the low moisture absorbing fiber a high moisture absorbing fiber.

It may also be desirable to improve the opacity and reduce the cost of the composite board. Inorganic filler additives may be used in any of the layers to accomplish both of these goals. Examples of inorganic fillers include calcium carbonates (e.g., ground or precipitated), clay, and $TiO_2$. When utilized, the inorganic fillers may be used in any amount up to 25% of the total weight of the layer into which it is included. During the formation of the layer(s) of the composite board, the inorganic filler additive may be compounded with the cellulose fiber and the low moisture absorbing fiber.

In an example, the first and second outer layers may also be treated with a hydrophobic resin, such as C1 to C12 alkyl acrylates and methacrylates. In this example, the first and second outer layers have hydrophobic resins impregnated therein during surface sizing. The composite board may also include more than three layers. In another example, the first and second outer layers may be coated with a pigmented coating including organic fillers, such as clay and/or carbonates. Pigmented coatings may also include binders, such as polymeric resins and/or natural high molecular weight materials, such as starch. It may be more desirable, in some instances, to use polymeric resins, which have binding power and are also hydrophobic in nature. Examples of suitable polymeric resins include styrene butadiene copolymer, polyacrylates, polyvinyl acetates, polyacrylic copolymers with styrene, polyesters, polymethacrylates, and polyurethanes. In some instances, the pigmented coating may include the polymeric resin in an amount ranging from about 15 parts to about 60 parts per 100 parts of inorganic filler.

In some instances, after the middle layer is formed, it is corrugated. A single corrugated layer may be used as the middle layer, or two corrugated layers may be adhered together so that a peak of one corrugated layer abuts a valley of the other corrugated layer. In other instances, the middle layer remains non-corrugated. A single non-corrugated layer may be used as the middle layer, or two or more non-corrugated layers may be adhered together to form the middle layer. Still further, the middle layer may include combinations of corrugated and non-corrugated layers (e.g., a corrugated sub-layer surrounded on opposed sides by non-corrugated sub-layers).

The first and second outer layers may then be adhered to opposed sides of the middle layer using a polymeric adhesive or chemically treated starch in order to form the composite board.

The composite board may be used in a variety of applications. In an example, the composite board is cut and scored into a foldable material that may be used to form an art frame.

An example of the foldable material 12 that is formed from the composite board 10 is shown in FIG. 1A. A cross-section of the foldable material 12 and composite board 10 of FIG. 1A is shown in FIG. 1B. This view schematically illustrates the middle layer 27 (including a single corrugated layer) sandwiched between the first and second outer layers 23 and 25. As illustrated, this example of the middle corrugated layer 27 includes the cellulose fibers 17, the low moisture absorbing fibers 19 (which may be excluded in some examples), and the moisture repelling agent 21, while the first and second outer layers 23 and 25 each include the cellulose fibers 17 and the low moisture absorbing fibers 19. FIG. 1C illustrates another example of a cross-sectional view of the foldable material 12 and composite board 10. In this example, the middle layer 27 includes two corrugated layers adhered together in the manner shown in the figure. As illustrated, the two corrugated layers of the middle layer 27 include the cellulose fibers 17 and the moisture repelling agent 21, while the first and second outer layers 23 and 25 each include the cellulose fibers 17 and the low moisture absorbing fibers 19.

Figure 3A:
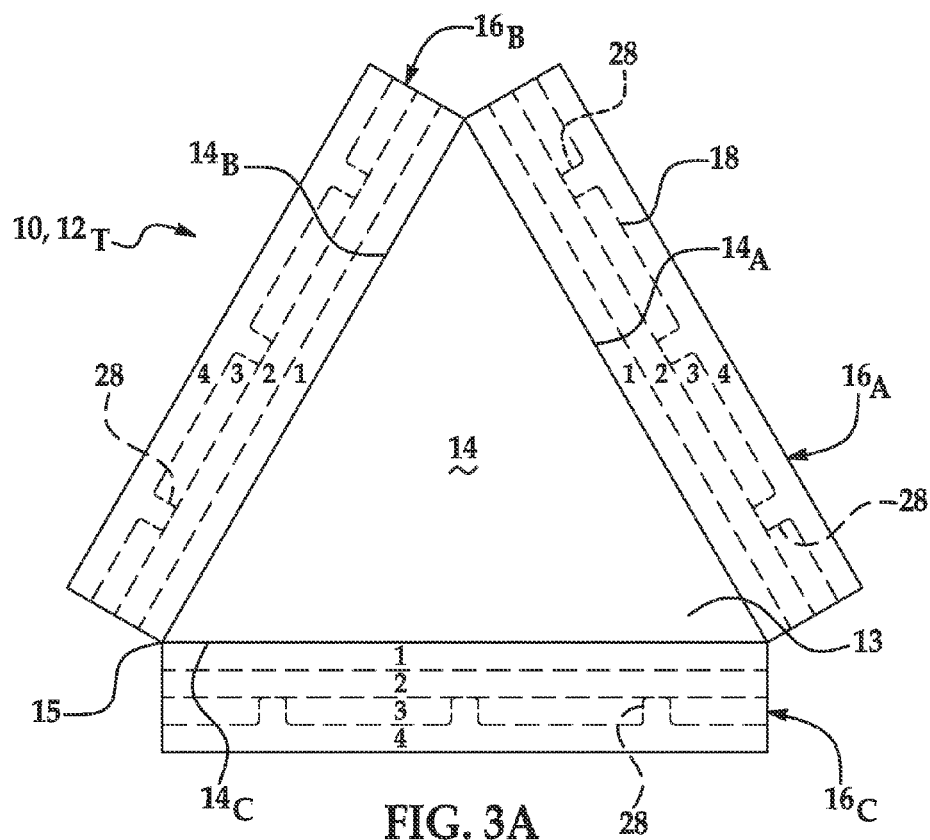
FIG. 3A is a front view of another example of a foldable material formed of an example of the composite board.
Figure 4A:
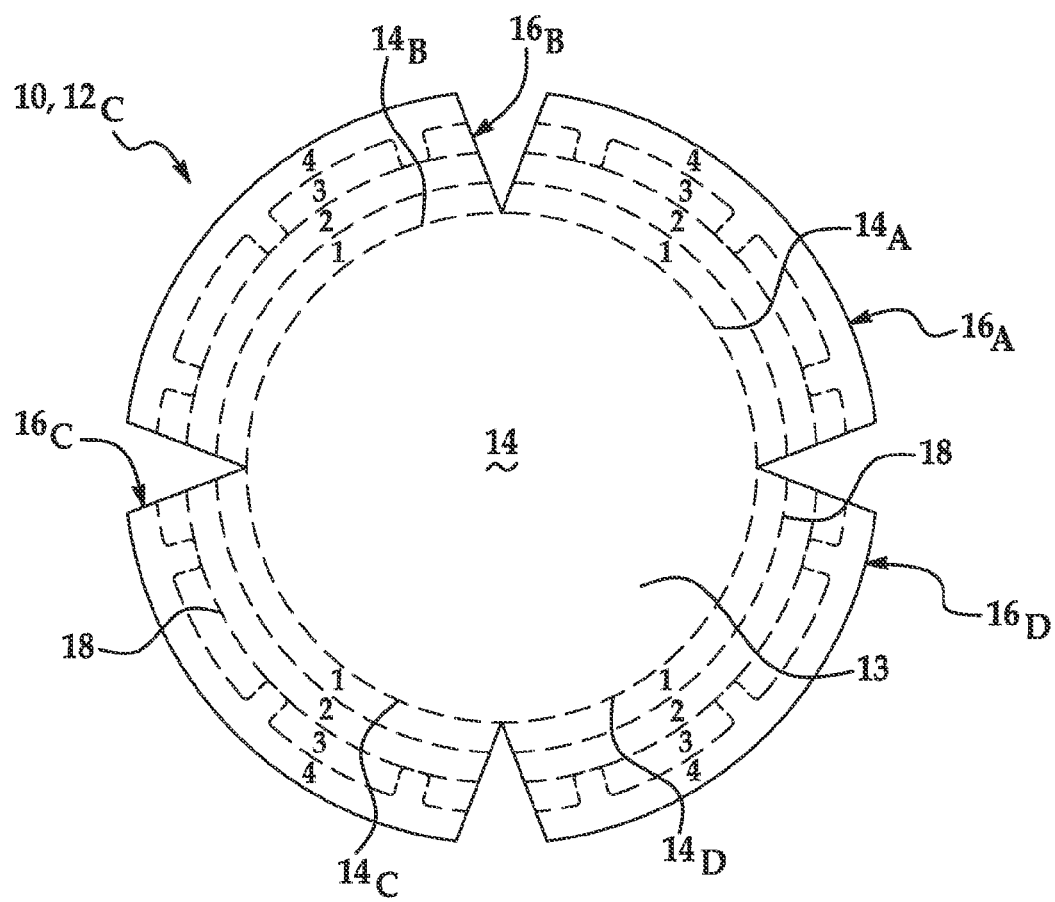
FIG. 4A is a front view of another example of a foldable material formed of an example of the composite board.
Figure 5A:
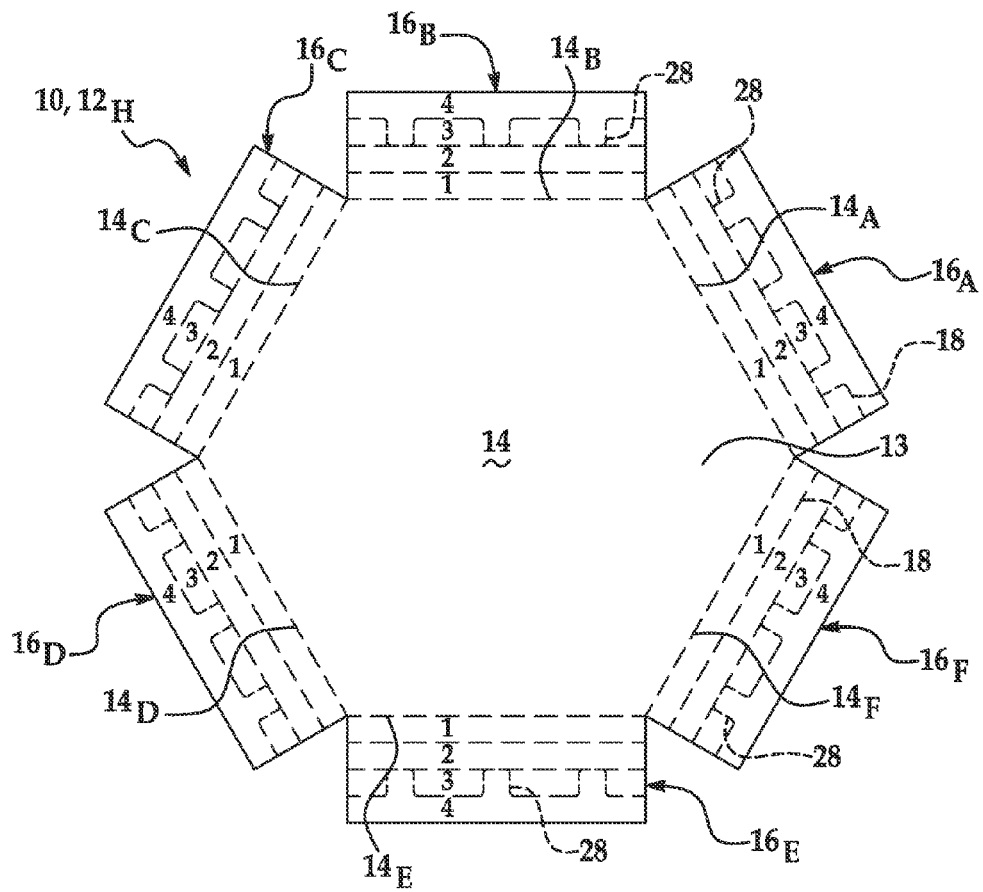
FIG. 5A is a front view of yet another example of a foldable material formed of an example of the composite board.

FIG. 1A is a front view of the foldable material 12 (formed from the composite board 10) having a center portion 14. The foldable material 12 has two opposed surfaces 13 (e.g., the surface of first outer layer 23, shown in FIGS. 1A and 1B), 15 (e.g., the surface of second outer layer 25, shown in FIGS. 1B and 2A), and the center portion 14 in this example has four sides $14_A$, $14_B$, $14_C$, $14_D$. In other examples (see FIGS. 3A, 4A and 5A), the center portion 14 has three sides, five or more sides, or rounded/curved sides. When the center portion 14 has four sides $14_A$, $14_B$, $14_C$, $14_D$, the center portion 14 may be square or rectangular (as shown in FIG. 1A) or round (as shown in FIG. 3A). When the center portion 14 has more than four sides, the shape of the center portion 14 will depend upon the number of sides (e.g., six sides correspond with a hexagon shaped center portion 14 as shown in FIG. 5A).

A foldable extension $16_A$, $16_B$, $16_C$, $16_D$ respectively extends from each side $14_A$, $14_B$, $14_C$, $14_D$ of the center portion 14. The foldable extensions $16_A$, $16_B$, $16_C$, $16_C$ may be scored with fold lines 18 that are meant to guide the folding of the foldable extensions $16_A$, $16_B$, $16_C$, $16_D$ toward the surface 15. In an example, each foldable extension $16_A$, $16_B$, $16_C$, $16_D$ has four fold lines 18 defining four respective folds 1, 2, 3, 4. In this example then, each foldable extension $16_A$, $16_B$, $16_C$, $16_D$ is foldable four times, once along each scored fold line 18. In other examples, it is to be understood that more than four fold lines 18 may be included on any one foldable extension $16_A$, $16_B$, $16_C$, $16_D$ so that the foldable extension $16_A$, $16_B$, $16_C$, $16_D$ is foldable at least four times.

The foldable extensions $16_A$, $16_B$, $16_C$, $16_D$ and the folds 1, 2, 3, 4 may have any suitable shape that allows the folds 1, 2, 3, 4 of the respective foldable extension $16_A$, $16_B$, $16_C$, $16_D$ to be folded toward the surface 15 to form a three-dimensional frame portion (see reference numerals $22_A$, $22_B$, $22_C$, $22_D$ in FIG. 2A).

The foldable material 12 is folded to form the frame portions $22_A$, $22_B$, $22_C$, $22_D$ and the art frame 20, as shown in FIG. 2A. As depicted, each frame portion $22_A$, $22_B$, $22_C$, $22_D$ abuts another frame portion $22_A$, $22_B$, $22_C$, $22_D$ to form the corners of the art frame 20.

This example of the art frame 20 does not have an image receiving medium attached thereto. It is to be understood that an image receiving medium having an image printed thereon may be adhered to all or a portion of the surface 13 of the foldable material 12 before the material 12 is folded to form the art frame 20. Examples of the image receiving medium and the image will be discussed further hereinbelow.

To construct the art frame 20, fold 1 of each of the extensions $16_A$, $16_B$, $16_C$, $16_D$ is folded inward (i.e., towards the surface 15). The fold 1 of a respective extension $16_A$, or $16_B$, or $16_C$, or $16_D$ forms an outer wall of the respective frame portion $22_A$, $22_B$, $22_C$, or $22_D$. All together, the folds 1 form the perimeter wall of the art frame 20. Fold 2 of each of the extensions $16_A$, $16_B$, $16_C$, $16_D$ is folded inward (i.e., towards the surface 15). The fold 2 of a respective extension $16_A$, or $16_B$, or $16_C$, or $16_D$ forms a back surface of the respective frame portion $22_A$, $22_B$, $22_C$, or $22_D$. All together, the folds 2 form the back surface of the art frame 20. Fold 3 of each of the extensions $16_A$, $16_B$, $16_C$, $16_D$ is then folded inward (i.e., towards the surface 15). The fold 3 of a respective extension $16_A$, or $16_B$, or $16_C$, or $16_D$ forms an inner wall of the respective frame portion $22_A$, $22_B$, $22_C$, or $22_D$. All together, these folds 3 form the inner perimeter wall of the art frame 20. Finally, fold 4 of each of the extensions $16_A$, $16_B$, $16_C$, $16_D$ is then folded inward (i.e., towards the surface 15). These folds 4 are adhered, or otherwise secure to, the surface 15 of the foldable material 12 at the center portion 14.

Figure 2B:
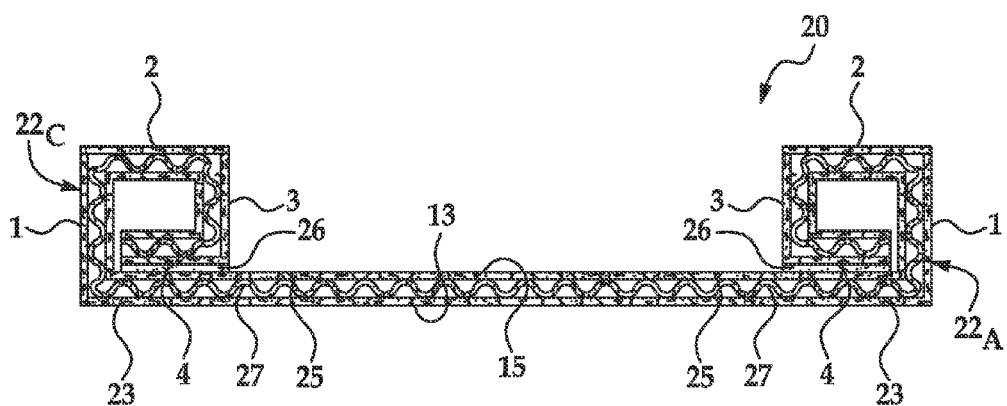
FIG. 2B is a semi-schematic, cross-sectional view taken along line 2B-2B in FIG. 2A.

An adhesive layer 26 used to secure the folds 4 to the surface 15 is shown in FIG. 2B (i.e., a cross-sectional view of FIG. 2A). When folding the folds 1, 2, 3, and 4, the adhesive layer 26 may be applied to fold 4 (or, for example, to a fold of an image receiving medium adhered to the foldable material 12 at the outermost fold) and then adhered to the surface 15. Once the folds 4 are secured, the frame portions $22_A$, $22_B$, $22_C$, and $22_D$ and the art frame 20 are formed.

The adhesive layer 26 may be pre-coated onto the surface 13 (i.e., the surface of the first outer layer 23) at the outermost fold 4. Prior to folding, the pre-coated adhesive layer 26 may have a removable/release liner (not shown) attached thereto. The adhesive layer 26 may be applied to the surface 13 of the foldable material 12 at folds 4 using an air knife coater, a rod coater, a slot die coater, roll coater, or a film transfer coater. Examples of suitable adhesives include acrylate polymer adhesives. In one example, the adhesive layer 26 is applied directly onto a release liner, and then the glued release liner is laminated onto the desired portion (e.g., fold 4) of the foldable material 12 using a laminator. The removable liner may protect the adhesive layer 26 from contamination and from prematurely adhering.

The release liner may include a substrate and release coating deposited on the release coating. The substrate may be a cellulose paper and/or a polymeric film, such as polyethylene, polypropylene or polyethylene terephthalate (PET). The release coating is made of material(s) that is/are readily able to delaminate from the adhesive layer 26 and do not migrate or transfer to the released material (i.e., adhesive layer 26) to any significant degree. Examples of the release coating of the release liner include polyacrylates, carbamates, polyolefins, fluorocarbons, chromium stearate complexes and silicones. In one example, the silicones release coating may be desirable, at least in part because it can easily be applied on various substrates and can be cured into a polydimethylsiloxane (PDMS) network, which limits migration into an adhesive matrix. Silicones may also allow substantially lower release forces than other materials.

While not shown, it is to be understood that a support material may be inserted into the art frame 20 adjacent to the surface 15 at the center portion 14. The support material may be the composite board disclosed herein, cardboard or another strengthening material that adds support, but not significant weight, to the art frame 20. The support material may or may not be adhered to the center portion 14.

FIGS. 3A through 5B depict different foldable materials $12_T$, $12_C$, and $12_H$ that may be formed from the composite board 10. While not shown in this figures, it is to be understood that the composite board 10 in these examples includes the middle layer 27 and the first and second outer layers 23, 25.

Figure 3B:
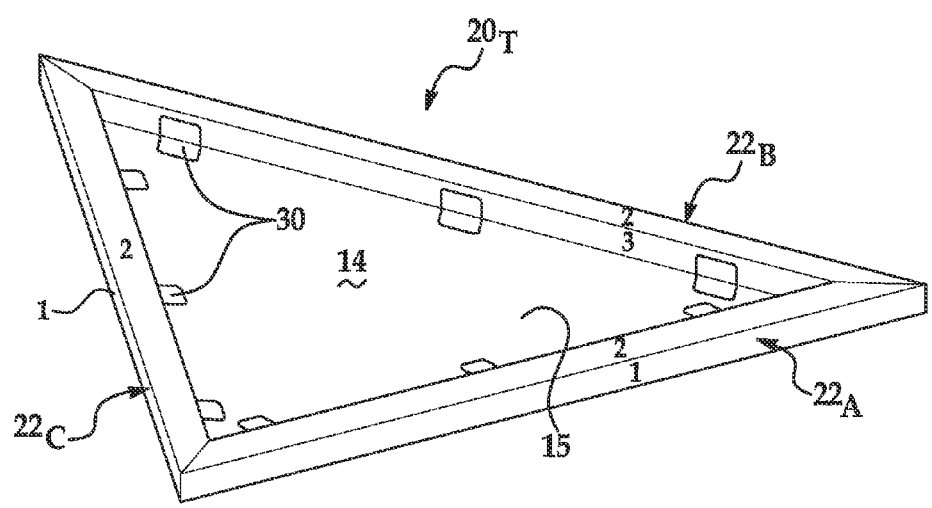
FIG. 3B is a back, perspective view of the example of the foldable material of FIG. 3A after it has been folded to form another example of the art frame.
Figure 4B:
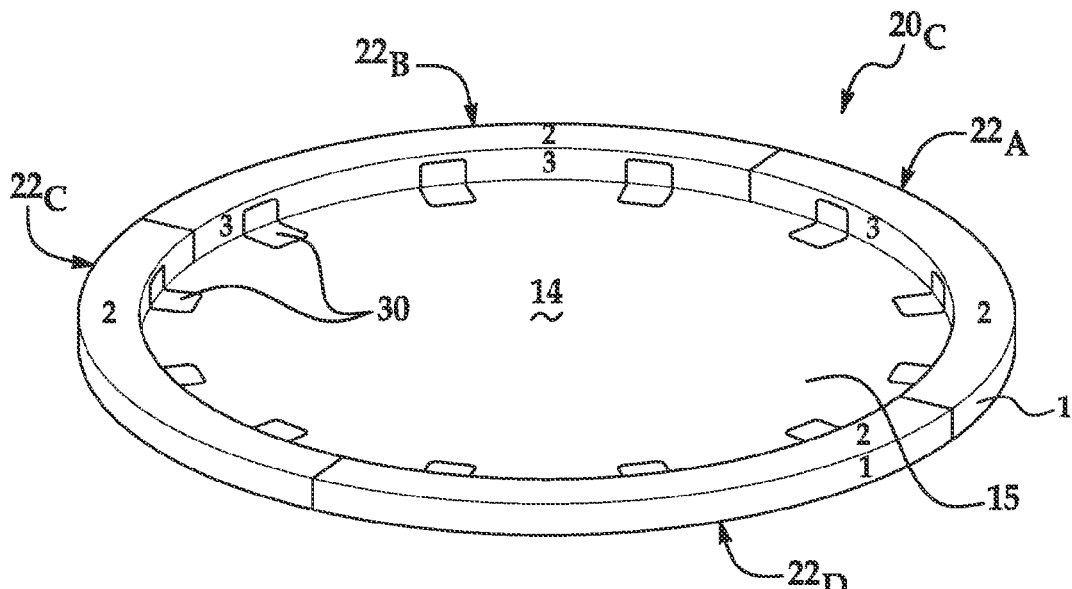
FIG. 4B is a back, perspective view of the example of the foldable material of FIG. 4A after it has been folded to form another example of the art frame.
Figure 5B:
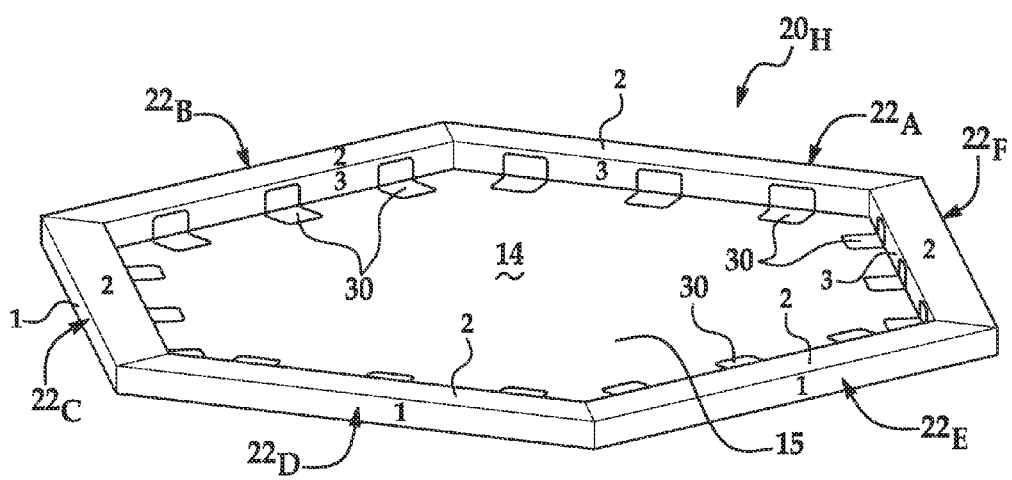
FIG. 5B is a back, perspective view of the example of the foldable material of FIG. 5A after it has been folded to form yet another example of the art frame.

FIGS. 3A and 3B respectively depict a triangularly shaped foldable material $12_T$ and the art frame $20_T$ formed therefrom. FIGS. 4A and 4B respectively depict a circular shaped foldable material $12_C$ and the art frame $20_C$ formed therefrom. FIGS. 5A and 5B respectively depict a hexagon shaped foldable material $12_H$ and the art frame $20_H$ formed therefrom.

Referring specifically to FIG. 3A, a front view of the triangularly shaped foldable material $12_T$ is depicted. This foldable material $12_T$ has the center portion 14 with three sides $14_A$, $14_B$, $14_C$, and the opposed surfaces 13 (i.e., surface of first outer layer 23) and 15 (i.e., surface of the second outer layer 25). Since the center portion 14 in this example has three sides $14_A$, $14_B$, $14_C$, the center portion is triangular.

A foldable extension $16_A$, $16_B$, $16_C$ respectively extends from each side $14_A$, $14_B$, $14_C$ of the center portion 14. The foldable extensions $16_A$, $16_B$, $16_C$, may be scored with fold lines 18 that are meant to guide the folding of the foldable extensions $16_A$, $16_B$, $16_C$ toward the surface 15. In an example, each foldable extension $16_A$, $16_B$, $16_C$ has four fold lines 18 defining four respective folds 1, 2, 3, 4. In this example then, each foldable extension $16_A$, $16_B$, $16_C$ is foldable four times, once along each scored fold line 18. In other examples, it is to be understood that more than four fold lines 18 may be included on any one foldable extension $16_A$, $16_B$, $16_C$ so that the foldable extension $16_A$, $16_B$, $16_C$ is foldable at least four times.

In this example, the outermost fold line 18 defining the fold 4 and part of the fold 3 also defines a tab line 28. The tab line 28 may be scored so that when the folds 4 are folded, a tab 30 disconnects (either automatically or with application of a small force) along the tab line 28. The tab 30 can then be folded toward and secured to the surface 15 (see FIG. 3B). Within the tab lines 28 on the surface 13, the fold 3 may have an adhesive layer and a release liner attached thereto. This may be desirable to secure the tab 30 to the surface 15 as shown in FIG. 3B.

The foldable extensions $16_A$, $16_B$, $16_C$ and the folds 1, 2, 3, 4 may have any suitable shape that allows the folds 1, 2, 3, 4 of the respective foldable extension $16_A$, $16_B$, $16_C$ to be folded toward the surface 15 to form a three-dimensional frame portion (see reference numerals $22_A$, $22_B$, $22_C$ in FIG. 3B). In the example shown in FIGS. 3A and 3B, the foldable extensions $16_A$, $16_B$, $16_C$ are angled so that when folded, the abutting frame portions $22_A$, $22_B$, $22_C$ form corners of the triangular art frame $20_T$.

The triangularly shaped foldable material $12_T$ is folded to form the frame portions $22_A$, $22_B$, $22_C$ and the art frame $20_T$, as shown from the back, perspective view of FIG. 3B. This example of the art frame $20_T$ does not have an image receiving medium attached thereto. It is to be understood that an image receiving medium having an image printed thereon may be adhered to the surface 13 of the triangularly shaped foldable material $12_T$ before the material $12_T$ is folded to form the art frame $20_T$.

To construct the art frame $20_T$, fold 1 of each of the extensions $16_A$, $16_B$, $16_C$ is folded inward (i.e., towards the surface 15). The fold 1 of a respective extension $16_A$, or $16_B$, or $16_C$ forms an outer wall of the respective frame portion $22_A$, $22_B$, $22_C$. All together, the folds 1 form the perimeter wall of the art frame $20_T$. Fold 2 of each of the extensions $16_A$, $16_B$, $16_C$ is folded inward (i.e., towards the surface 15). The fold 2 of a respective extension $16_A$, or $16_B$, or $16_C$ forms a back surface of the respective frame portion $22_A$, $22_B$, or $22_C$. All together, the folds 2 form the back surface of the art frame $20_T$. Fold 3 of each of the extensions $16_A$, $16_B$, $16_C$ is then folded inward (i.e., towards the surface 15 of the center portion 14). The fold 3 of a respective extension $16_A$, or $16_B$, or $16_C$ forms an inner wall of the respective frame portion $22_A$, $22_B$, or $22_C$. All together, these folds 3 form the inner perimeter wall of the art frame $20_T$. Finally, fold 4 of each of the extensions $16_A$, $16_B$, $16_C$ is then folded inward (i.e., towards the surface 15). When fold 4 is folded, the tab line 28 may be punched out to detach the tab 30 along the tab line 28. The folds 4 and the tab 30 are adhered, or otherwise secure to, the surface 15 at the center portion 14 of the foldable material $12_T$.

Referring specifically to FIG. 4A, a front view of the circular shaped foldable material $12_C$ is depicted. This foldable material $12_C$ has the center portion 14 with four sides $14_A$, $14_B$, $14_C$, $14_D$, and opposed surfaces 13 (i.e., surface of the first outer layer 23) and 15 (i.e., surface of the second outer layer 25). In this example, the center portion 14 is round, and thus the sides $14_A$, $14_B$, $14_C$, $14_D$ are curved.

A foldable extension $16_A$, $16_B$, $16_C$, $16_C$ respectively extends from each side $14_A$, $14_B$, $14_C$, $14_D$ of the center portion 14. The foldable extensions $16_A$, $16_B$, $16_C$, $16_D$ may be scored with fold lines 18 that are meant to guide the folding of the foldable extensions $16_A$, $16_B$, $16_C$, $16_D$ toward the surface 15. In an example, each foldable extension $16_A$, $16_B$, $16_C$, $16_C$ has four fold lines 18 defining four respective folds 1, 2, 3, 4. In this example then, each foldable extension $16_A$, $16_B$, $16_C$, $16_D$ is foldable four times, once along each scored fold line 18. In other examples, it is to be understood that more than four fold lines 18 may be included on any one foldable extension $16_A$, $16_B$, $16_C$, $16_D$ so that the foldable extension $16_A$, $16_B$, $16_C$, $16_D$ is foldable at least four times.

In this example, the outermost fold line 18 defining the fold 4 and part of the fold 3 also defines a tab line 28. The tab line 28 may be scored so that when the folds 4 are folded, the tab 30 disconnects (either automatically or in response to a small force) along the tab line 28. The tab 30 can then be folded toward and secured to the surface 15 (see FIG. 4B). Within the tab line 28 on the surface 13, the fold 3 may have an adhesive layer and a release liner attached thereto. This may be desirable to secure the tab 30 to the surface 15 as shown in FIG. 4B.

The foldable extensions $16_A$, $16_B$, $16_C$, $16_D$ and the folds 1, 2, 3, 4 may have any suitable shape that allows the folds 1, 2, 3, 4 of the respective foldable extension $16_A$, $16_B$, $16_C$, $16_D$ to be folded toward the surface 15 to form a three-dimensional frame portion (see reference numerals $22_A$, $22_B$, $22_C$, and $22_D$ in FIG. 4B). For example, a slit may be formed at or near a center point of each extension $16_A$, $16_B$, $16_C$, $16_D$ in order to accommodate for the curve of the respective extensions $16_A$, $16_B$, $16_C$, $16_D$. In the example shown in FIGS. 4A and 4B, the foldable extensions $16_A$, $16_B$, $16_C$, $16_C$ are angled with respect to the sides $14_A$, $14_B$, $14_C$, $14_D$ so that when folded, the abutting frame portions $22_A$, $22_B$, $22_C$, $22_D$ form the circular art frame $20_C$.

The circular shaped foldable material $12_C$ is folded to form the frame portions $22_A$, $22_B$, $22_C$, $22_D$ and the art frame $20_C$, as shown from the back, perspective view of FIG. 4B. This example of the art frame $20_C$ does not have an image receiving medium attached thereto. It is to be understood that an image receiving medium having an image printed thereon may be adhered to the surface 13 of the circular shaped foldable material $12_C$ before the material $12_C$ is folded to form the art frame $20_C$.

To construct the art frame $20_C$, fold 1 of each of the extensions $16_A$, $16_B$, $16_C$, $16_D$ is folded inward (i.e., towards the surface 15). The fold 1 of a respective extension $16_A$, or $16_B$, or $16_C$, or $16_D$ forms an outer wall of the respective frame portion $22_A$, $22_B$, $22_C$, $22_D$. All together, the folds 1 form the perimeter wall of the art frame $20_C$. Fold 2 of each of the extensions $16_A$, $16_B$, $16_C$, $16_D$ is folded inward (i.e., towards the surface 15). The fold 2 of a respective extension $16_A$, or $16_B$, or $16_C$, or $16_D$ forms a back surface of the respective frame portion $22_A$, $22_B$, $22_C$, or $22_D$. All together, the folds 2 form the back surface of the art frame $20_C$. Fold 3 of each of the extensions $16_A$, $16_B$, $16_C$, $16_D$ is then folded inward (i.e., towards the surface 15). The fold 3 of a respective extension $16_A$, or $16_B$, or $16_C$, or $16_D$ forms an inner wall of the respective frame portion $22_A$, $22_B$, $22_C$, or $22_D$. All together, these folds 3 form the inner perimeter wall of the art frame $20_C$. Finally, fold 4 of each of the extensions $16_A$, $16_B$, $16_C$, $16_D$ is then folded inward (i.e., towards the surface 15). When fold 4 is folded, the tab line 28 may be punched out to detach the tab 30 along the tab line 28. The folds 4 and the tab 30 are adhered, or otherwise secure to, the surface 15 of the center portion 14 of the foldable material $12_C$.

Referring now specifically to FIG. 5A, a front view of the hexagon shaped foldable material $12_H$ is depicted. This foldable material $12_H$ has the center portion 14 with six sides $14_A$, $14_B$, $14_C$, $14_D$, $14_E$, $14_F$, and opposed surfaces 13 (i.e., surface of the first outer layer 23) and 15 (i.e., surface of the second outer layer 25). Since the center portion 14 in this example has six sides $14_A$, $14_B$, $14_C$, $14_D$, $14_E$, $14_F$, the center portion 14 is hexagonal. While a hexagon shaped center portion 14 is shown, any desirable polygon may be used as the shape of the center portion 14.

A foldable extension $16_A$, $16_B$, $16_C$, $16_D$, $16_E$, $16_F$ respectively extends from each side $14_A$, $14_B$, $14_C$, $14_D$, $14_E$, $14_F$ of the center portion 14. The foldable extensions $16_A$, $16_B$, $16_C$, $16_D$, $16_E$, $16_F$ may be scored with fold lines 18 that are meant to guide the folding of the foldable extensions $16_A$, $16_B$, $16_C$, $16_D$, $16_E$, $16_F$ toward the surface 15. In an example, each foldable extension $16_A$, $16_B$, $16_C$, $16_D$, $16_E$, $16_F$ has four fold lines 18 defining four respective folds 1, 2, 3, 4. In this example then, each foldable extension $16_A$, $16_B$, $16_C$, $16_D$, $16_E$, $16_F$ is foldable four times, once along each scored fold line 18. In other examples, it is to be understood that more than four fold lines 18 may be included on any one foldable extension $16_A$, $16_B$, $16_C$, $16_D$, $16_E$, $16_F$ so that the foldable extension $16_A$, $16_B$, $16_C$, $16_D$, $16_E$, $16_F$ is foldable at least four times.

In this example, the outermost fold line 18 defining the fold 4 and part of the fold 3 also defines a tab line 28. The tab line 28 may be scored so that when the folds 4 are folded, the tab 30 disconnects (either automatically or in response to a small force) along the tab line 28. The tab 30 can then be folded toward and secured to the surface 15 (see FIG. 5B). Within the tab line 28 on the surface 13, the fold 3 may have an adhesive layer and a release liner attached thereto. This may be desirable to secure the tab 30 to the surface 15 as shown in FIG. 5B.

The foldable extensions $16_A$, $16_B$, $16_C$, $16_D$, $16_E$, $16_F$ and the folds 1, 2, 3, 4 may have any suitable shape that allows the folds 1, 2, 3, 4 of the respective foldable extension $16_A$, $16_B$, $16_C$, $16_D$, $16_E$, $16_F$ to be folded toward the surface 15 to form a three-dimensional frame portion (see reference numerals $22_A$, $22_B$, $22_C$, $22_D$, $22_E$, $22_F$ in FIG. 5B). In the example shown in FIGS. 5A and 5B, the foldable extensions $16_A$, $16_B$, $16_C$, $16_D$, $16_E$, $16_F$ are angled so that when folded, the abutting frame portions $22_A$, $22_B$, $22_C$, $22_D$, $22_E$, $22_F$ form corners of the hexagonal art frame $20_H$.

The hexagonal shaped foldable material $12_H$ is folded to form the frame portions $22_A$, $22_B$, $22_C$, $22_D$, $22_E$, $22_F$ and the art frame $20_H$, as shown from the back, perspective view of FIG. 5B. This example of the art frame $20_H$ does not have an image receiving medium attached thereto. It is to be understood that an image receiving medium having an image printed thereon may be adhered to the surface 13 of the hexagonal shaped foldable material $12_H$ before the material $12_H$ is folded to form the art frame $20_H$.

To construct the art frame $20_H$, fold 1 of each of the extensions $16_A$, $16_B$, $16_C$, $16_D$, $16_E$, $16_F$ is folded inward (i.e., towards the surface 15). The fold 1 of a respective extension $16_A$, or $16_B$, or $16_C$, or $16_D$, or $16_E$, or $16_F$ forms an outer wall of the respective frame portion $22_A$, $22_B$, $22_C$, $22_D$, $22_E$, or $22_F$. All together, the folds 1 form the perimeter wall of the art frame $20_H$. Fold 2 of each of the extensions $16_A$, $16_B$, $16_C$, $16_D$, $16_E$, $16_F$ is folded inward (i.e., towards the surface 15). The fold 2 of a respective extension $16_A$, or $16_B$, or $16_C$, or $16_D$, or $16_E$, or $16_F$ forms a back surface of the respective frame portion $22_A$, $22_B$, $22_C$, $22_D$, $22_E$, or $22_F$. All together, the folds 2 form the back surface of the art frame $20_H$. Fold 3 of each of the extensions $16_A$, $16_B$, $16_C$, $16_D$, $16_E$, $16_F$ is then folded inward (i.e., towards the surface 15 of the center portion 14). The fold 3 of a respective extension $16_A$, or $16_B$, or $16_C$, or $16_D$, or $16_E$, or $16_F$ forms an inner wall of the respective frame portion $22_A$, $22_B$, $22_C$, $22_D$, $22_E$, or $22_F$. All together, these folds 3 form the inner perimeter wall of the art frame $20_H$. Finally, fold 4 of each of the extensions $16_A$, $16_B$, $16_C$, $16_D$, $16_E$, $16_F$ is then folded inward (i.e., towards the surface 15). When fold 4 is folded, the tab line 28 may be punched out to detach the tab 30 along the tab line 28. The folds 4 and the tab 30 are adhered, or otherwise secure to, the surface 15 at the center portion 14 of the foldable material $12_H$.

Any of the examples of the art frame 20, $20_T$, $20_C$, and $20_H$ disclosed herein may be used to display images, such as photographs, art work, text, graphics, etc., printed via any digital printer. The image is printed on an image receiving medium, and then the image receiving medium is adhered to the surface 13 of one of the foldable materials 12, $12_T$, $12_C$, $12_H$ before the material 12, $12_T$, $12_C$, $12_H$ is folded to form the respective art frame 20, $20_T$, $20_C$, $20_H$.

The image receiving medium may be any medium that is suitable for use with any digital printing device, such as a digital inkjet printer, a liquid electrophotographic printer (a liquid toner printer), or an electrophotographic printer (a dry toner laser printed). Any of these printers may be utilized to print the image, which may be based upon a digital image (e.g., a digital photograph) and/or may include text and/or graphics.

The image receiving medium is a foldable material which has a specific surface that is able to receive a digital image with high print quality. The specific surface may be made by coating or depositing a digital ink/toner receiving layer onto the outermost surface of a base substrate. In this example, coating or depositing refers to the application of a specifically formulated chemical composition onto the outermost surface of the base substrate of the image receiving medium by a suitable process which includes any type of coating process. The specific surface may also be made by surface treating the base substrate via a physical and/or chemical process (e.g., corona treatment, plasma grafting polymerization and/or acid etching). In this example, surface treating refers to a method for altering the surface structure or morphology chemically and/or physically without applying any foreign composition to cover the surface of the base substrate. The surface treating method modifies the nature of the base substrate surface by changing the surface morphology or changing the surface chemical functional groups.

In one example, the image receiving medium includes a cellulose paper base, and the outermost surface of the cellulose paper base is surface functionalized with a digital ink/ toner receiving layer. The composition of the digital ink/toner receiving layer may include binder(s) (e.g., water-based binders such as polyvinyl alcohol, styrene-butadiene emulsion, acrylonitrile-butadiene latex, or combinations thereof) and inorganic pigment particle(s) (e.g., clay, kaolin, calcium carbonate, or combinations thereof). The digital ink/toner receiving layer may be subjected to an embossing treatment to create a desirable surface texture which is represented by a lay pattern. "Lay" is a measure of the direction of the predominant machining pattern. A lay pattern is a repetitive impression created on the surface of a part. The lay patterns created on the image receiving medium 24 include, for example, vertical patterns, horizontal patterns, radial patterns, circular patterns, isotropic patterns and cross hatched patterns.

In another example, the image receiving medium is made of a foldable material based on a polymeric film. Examples of suitable polymeric films include polyolefin films (e.g., polyethylene and polypropylene films), polycarbonate films, polyamide films, polytetrafluoroethylene (PTFE) films. These polymeric films can be used alone, or they can be co-extruded with another material, such as cellulose paper, to form a foldable image receiving medium. In some examples, the polymeric film surface is pre-coated with an example of the digital ink/toner receiving layer disclosed herein and/or is surface treated to improve the ink reception and toner adhesion.

In yet another example, the image receiving medium is made of a foldable ductile metal foil. The metal foil may be a pure metal and/or a metal alloy. In some examples, the metal foil surface is pre-coated with an example of the digital ink/toner receiving layer disclosed herein and/or is surface treated to improve the ink reception and toner adhesion.

As mentioned above, the image may be created using any suitable digital printing technique. It is believed that the durability of the printed image may be the result of the combination of the medium and the ink or toner that is used. For example, a medium including a digital ink/toner receiving layer or having been surface treated may be desirable when digital electrophotographic printing is used with toners that contain a durable colorant and UV, light and ozone fastness resin binders. In another example, a durable printed image is formed when a pigment inkjet ink is printed, using inkjet technology, onto a micro-porous image receiving medium. In this example, a pigment or any number of pigment blends may be provided in the inkjet ink formulation to impart color to the ink. As such, the pigment may be any number of desired pigments dispersed throughout the resulting inkjet ink. More particularly, the pigment included in the inkjet ink may include self-dispersed (surface modified) pigments, or pigments accompanied by a dispersant.

The image receiving medium and the foldable material 12, 12$_T$, 12$_C$, 12$_H$ may be the same shape and size. The matching size and shape of the foldable materials 12, 12$_T$, 12$_C$, 12$_H$ and the image receiving medium enable a user to easily align the two using the edges. In other examples, the image receiving medium is the same size and shape as the center portion 14, or the same size and shape as the center portion 14 and the innermost tab 1 of the foldable extensions 16$_A$, 16$_B$, 16$_C$, 16$_D$, 16$_E$, 16$_F$.

When the image receiving medium covers the entire foldable material 12, 12$_T$, 12$_C$, 12$_H$, portions of the image receiving medium are folded with the foldable extensions 16$_A$, 16$_B$, 16$_C$, 16$_D$, 16$_E$, 16$_F$. In this example, when the material 12 and image receiving medium are folded, the folds of the image receiving medium will be viewable and adhered to the surface 15. In other instances, for example, when the image receiving medium covers the center portion 14 alone and the material 12, 12$_T$, 12$_C$, 12$_H$ is folded, the folds 1, 2, 3 will be viewable and fold 4 will be adhered to the surface 15. In still other instances, the image receiving medium may be visible along the perimeter wall of the art frame 20, and the foldable material 12, 12$_T$, 12$_C$, 12$_H$ may be visible along the other areas (back surface and inner wall) of the frame portions 22$_A$, 22$_B$, 22$_C$, 22$_D$, 22$_E$, 22$_F$.

An adhesive layer (not shown) may be pre-coated onto the foldable material 12, 12$_T$, 12$_C$, 12$_H$. When the image receiving medium is the same size and shape as the center portion 14 alone, the adhesive layer may be deposited on the entire surface 13 at the center portion 14, but may not be deposited on the surface 13 at the foldable extensions 16$_A$, 16$_B$, 16$_C$, 16$_D$, 16$_E$, 16$_F$. Alternatively, in this example, the adhesive layer may be deposited on the surface 13 at the center portion 14 and at the outermost tab 4 of each foldable extension 16$_A$, 16$_B$, 16$_C$, 16$_D$, 16$_E$, 16$_F$. This may be desirable to adhere the image receiving medium to the center portion 14 alone and to use the adhesive on the outermost tabs 4 for adhering the tabs 4 when the foldable material 12, 12$_T$, 12$_C$, 12$_H$ is folded. When the image receiving medium is the same size and shape as the center portion 14 and the innermost tab 1 of the foldable extensions 16$_A$, 16$_B$, 16$_C$, 16$_D$, 16$_E$, 16$_F$, the adhesive layer may be formed on the surface 13 at the center portion 14 and at the innermost tab 1 of each foldable extension 16$_A$, 16$_B$, 16$_C$, 16$_D$, 16$_E$, 16$_F$. Alternatively, the adhesive layer may be deposited on the surface 13 at the center portion 14, at the innermost tab 1 of each foldable extension 16$_A$, 16$_B$, 16$_C$, 16$_D$, 16$_E$, 16$_F$, and at the outermost tab 4 of each foldable extension 16$_A$, 16$_B$, 16$_C$, 16$_D$, 16$_E$, 16$_F$. This may be desirable to adhere the image receiving medium to the center portion 14 and the innermost tabs 1 (which will be viewable from the side when the art frame 20, 20$_T$, 20$_C$, 20$_H$ is formed) and to use the adhesive on the outermost tabs 4 for adhering the tabs 4 when the foldable material 12, 12$_T$, 12$_C$, 12$_H$ is folded. It is to be understood that in these examples, removable/release liners may be positioned on the adhesive layer(s) until it is desirable to adhere the image receiving medium and/or to adhere the tabs 4 during folding.

In an example, the adhesive layer that adheres the image receiving medium to the foldable material 12, 12$_T$, 12$_C$, 12$_H$ has a thickness ranging from about 30 μm to about 450 μm. If the adhesive layer thickness is less than 30 μm, the internal stress generated between the image receiving medium and the foldable material foldable material 12, 12$_T$, 12$_C$, 12$_H$ may cause adhesion failure. In some instances, the adhesive layer exhibits a pressure sensitivity property. This property provides an adhesion strength between two adhered surfaces, for example, when a moderate pressure is applied (e.g., by hands).

After the image receiving medium is adhered to all or a portion of the foldable material 12, 12$_T$, 12$_C$, 12$_H$ and prior to folding, rubber rollers may be used to apply force to the adhered materials to remove any air bubbles entrapped between the adhered materials.

As mentioned above, the image receiving medium may be the same shape and size as the foldable material 12, 12$_T$, 12$_C$, 12$_H$. As such, the image receiving medium may have an image receiving portion that is shaped and sized in the same manner as the center portion 14 of the foldable material 12, 12$_T$, 12$_C$, 12$_H$, and image receiving extensions that respectively extend from each side of the image receiving portion. The extensions of the image receiving medium may be scored with fold lines that match the fold lines 18 of the foldable extensions 16$_A$, 16$_B$, 16$_C$, 16$_D$, 16$_E$, 16$_F$.

It is to be understood that the ranges provided herein include the stated range and any value or sub-range within the stated range. For example, a range from about 0.5 mm to about 3 mm should be interpreted to include not only the explicitly recited limits of about 0.5 mm to about 3 mm, but also to include individual values, such as 0.75 mm, 1 mm, etc., and sub-ranges, such as from about 1.5 mm to about 2.5 mm, from about 0.8 mm to about 2.8 mm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A composite board, comprising:
   a first outer layer including chemical pulped cellulose fibers and low moisture absorbing fibers;
   a second outer layer including the chemical pulped cellulose fibers and the low moisture absorbing fibers; and
   a middle layer positioned between the first and second outer layers, the middle layer including cellulose fibers and a moisture repelling agent.

2. The composite board as defined in claim 1 wherein the moisture repelling agent is chosen from a silane-based repellant, a polyolefin wax-based repellant, a paraffin wax-based repellant, and a reaction product of a hydrocarbon wax with rosin resin, fluoropolymers, fluoro-silicone copolymers, vinylidene chloride latex, hydrophobic polymers, or hydrophobic copolymers.

3. The composite board as defined in claim 1 wherein the low moisture absorbing fibers have a water intake of less than 0.8% by weight when exposed to 30° C. and 80% humidity for 24 hours.

4. The composite board as defined in claim 3 wherein the low moisture absorbing fibers are chosen from carbon fibers; synthetic fibers which are chosen from polyolefin fibers, polyolefin copolymer fibers, polyamide fibers, polyester fibers, polyurethane fibers, polycarbonate fibers, and polyacrylic fibers; and combinations thereof.

5. The composite board as defined in claim 4 wherein each of the synthetic fibers includes a surface that:
   has polar groups grafted thereon; or
   has been oxidized and etched.

6. The composite board as defined in claim 1, further comprising a hydrophobic resin impregnated into any of the first outer layer or the second outer layer.

7. The composite board as defined in claim 1 wherein the middle layer further includes low moisture absorbing fibers having a water intake of less than 0.8% by weight when exposed to 30° C. and 80% humidity for 24 hours.

8. The composite board as defined in claim 7 wherein the middle layer includes:
   the low moisture absorbing fibers in an amount ranging from about 5 parts to about 65 parts by weight for every 100 parts of the cellulose fibers; and
   the moisture repelling agent in an amount up to 5% by weight of a total weight of the corrugated layer.

9. The composite board as defined in claim 1 wherein the middle layer is corrugated.

10. The composite board as defined in claim 1, wherein any of the layers further comprises any of:
    a polymeric binder;
    a coupling agent; or
    an inorganic filler.

11. An art frame, comprising:
    a foldable material, including:
      two opposed surfaces;
      a center portion having at least three sides; and
      a foldable extension extending from each side of the center portion, each of the foldable extensions to be folded no less than four times toward one of the two opposed surfaces to form the art frame;
        the foldable material being formed of a composite board that includes:
        a first outer layer including chemical pulped cellulose fibers and low moisture absorbing fibers;
        a second outer layer including the chemical pulped cellulose fibers and the low moisture absorbing fibers; and
        a middle layer positioned between the first and second outer layers, the middle layer including cellulose fibers, low moisture absorbing fibers, and a moisture repelling agent.

12. The art frame as defined in claim 11 wherein the composite board includes:
    the low moisture absorbing fibers in an amount ranging from about 5 parts to about 65 parts by weight for every 100 parts of the cellulose fibers; and
    the moisture repelling agent in an amount up to 5% by weight of a total weight percent of the composite board.

13. The art frame as defined in claim 11 wherein the moisture repelling agent is chosen from a silane-based repellant, a polyolefin wax-based repellant, a paraffin wax-based repellant, and a reaction product of a hydrocarbon wax with rosin resin, fluoropolymers, fluoro-silicone copolymers, vinylidene chloride latex, hydrophobic polymers, or hydrophobic copolymers; and wherein the low moisture absorbing fibers are chosen from carbon fibers; synthetic fibers which are chosen from polyolefin fibers, polyolefin copolymer fibers, polyamide fibers, polyester fibers, polyurethane fibers, polycarbonate fibers, and polyacrylic fibers; and combinations thereof.

14. The art frame as defined in claim 11 wherein the art frame is three-dimensional, and wherein each of the foldable extensions includes four folds.

15. The art frame as defined in claim 14, further comprising:
    an adhesive layer established on the other of the two opposed surfaces at any of i) an outermost of the four folds that is to contact the one of the two opposed surfaces when folded; ii) the center portion; or iii) an innermost of the four folds; and
    a removable liner positioned on the adhesive layer.

* * * * *